United States Patent
Childress et al.

(10) Patent No.: US 10,303,799 B2
(45) Date of Patent: *May 28, 2019

(54) CONVERGING TOOL TERMINOLOGY

(71) Applicant: International Business Machines Corporation, Armonk, NY (US)

(72) Inventors: Rhonda L. Childress, Austin, TX (US); Donna M. Hickey, Longmont, CO (US); Randy S. Johnson, O'Fallon, MO (US); John F. Kelley, Polk City, FL (US); Tedrick N. Northway, Wood River, IL (US); Bradley K. Wells, Kennesaw, GA (US)

(73) Assignee: International Business Machines Corporation, Armonk, NY (US)

( * ) Notice: Subject to any disclaimer, the term of this patent is extended or adjusted under 35 U.S.C. 154(b) by 543 days.

This patent is subject to a terminal disclaimer.

(21) Appl. No.: 15/041,427

(22) Filed: Feb. 11, 2016

(65) Prior Publication Data

US 2017/0235834 A1    Aug. 17, 2017

(51) Int. Cl.
*G06F 17/30*  (2006.01)
*G06F 3/0482*  (2013.01)
(Continued)

(52) U.S. Cl.
CPC ...... *G06F 17/30684* (2013.01); *G06F 3/0482* (2013.01); *G06F 17/274* (2013.01); *G06F 17/2705* (2013.01); *G06F 17/277* (2013.01); *G06F 17/2785* (2013.01); *G06F 17/30554* (2013.01); *G06F 17/30696* (2013.01); *G06F 17/30864* (2013.01); *G06F 17/30867* (2013.01);

(Continued)

(58) Field of Classification Search
CPC ..................... G06F 17/30684; G06F 17/30864
See application file for complete search history.

(56) References Cited

U.S. PATENT DOCUMENTS

| | | |
|---|---|---|
| 5,206,949 A | 4/1993 | Cochran et al. |
| 5,600,835 A | 2/1997 | Garland et al. |

(Continued)

OTHER PUBLICATIONS

Appendix P: List of IBM Patents or Patent Applications Treated as Related; Dated Jan. 19, 2017; 2 pages.

(Continued)

*Primary Examiner* — Kris E Mackes
(74) *Attorney, Agent, or Firm* — Brian M. Restauro

(57) ABSTRACT

Embodiments of the present invention provide methods, computer program products, and systems for automatically generating a display to present different terms. Embodiments of the present invention can be used to identify a first and a second user using applications in a software as a service (SaaS) environment and store, for the first and the second user, a first term associated with the first user and a second term associated with the second user in the SaaS environment. Responsive to identifying the first term associated with the first user and the second term associated with the second user have functionally equivalent definitions, embodiments of the present invention can replace the second term associated with the second user with the first term associated with the first user and generate a display for the first term associated with the first user that replaced the second term associated with the second user.

20 Claims, 6 Drawing Sheets

(51) Int. Cl.
*G06F 17/27* (2006.01)
*G06Q 10/10* (2012.01)
*H04L 29/08* (2006.01)

(52) U.S. Cl.
CPC ....... *G06F 17/30873* (2013.01); *G06Q 10/10* (2013.01); *H04L 67/10* (2013.01); *G06F 2203/04803* (2013.01)

(56) References Cited

U.S. PATENT DOCUMENTS

| | | | |
|---|---|---|---|
| 5,606,690 | A | 2/1997 | Hunter et al. |
| 5,907,602 | A | 5/1999 | Peel et al. |
| 6,134,563 | A | 10/2000 | Clancey et al. |
| 6,216,479 | B1 | 4/2001 | Elwood |
| 6,236,017 | B1 | 5/2001 | Smartt et al. |
| 6,253,202 | B1* | 6/2001 | Gilmour .............. G06F 17/3061 |
| 6,343,935 | B1* | 2/2002 | Clements ................. G09B 7/02 434/156 |
| 6,772,110 | B2 | 8/2004 | Real et al. |
| 7,814,101 | B2 | 10/2010 | Bitsch |
| 8,001,125 | B1* | 8/2011 | Magdalin .......... G06F 17/30731 706/45 |
| 8,452,773 | B1 | 5/2013 | Young |
| 2001/0029455 | A1 | 10/2001 | Chin et al. |
| 2003/0101046 | A1 | 5/2003 | Krasnov |
| 2003/0160830 | A1* | 8/2003 | DeGross ............. G06F 17/2735 715/808 |
| 2008/0028319 | A1 | 1/2008 | Cox et al. |
| 2009/0248401 | A1* | 10/2009 | Grabarnik .......... G06F 17/2735 704/10 |
| 2011/0035403 | A1* | 2/2011 | Ismalon .............. G06F 17/3064 707/769 |
| 2012/0137235 | A1 | 5/2012 | T S et al. |
| 2012/0148033 | A1 | 6/2012 | Tibbits |
| 2012/0253814 | A1 | 10/2012 | Wang et al. |
| 2013/0326346 | A1* | 12/2013 | Zhu ...................... G06Q 10/101 715/260 |
| 2014/0358904 | A1* | 12/2014 | Nayak ............... G06F 17/30737 707/723 |
| 2015/0026267 | A1* | 1/2015 | Chakra .................. H04L 51/12 709/206 |
| 2015/0039286 | A1 | 2/2015 | Nikoulina et al. |
| 2017/0126631 | A1* | 5/2017 | Vikramaratne ..... H04L 63/0428 |

OTHER PUBLICATIONS

Childress et al.; U.S. Appl. No. 15/386,108, filed Dec. 21, 2016; Entitled "Converging Tool Terminology"; pp. 1-24.
Childress et al.; U.S. Appl. No. 15/409,605, filed Jan. 19, 2017; Entitled "Converging Tool Terminology"; pp. 1-24.
U.S. Appl. No. 15/084,897, Entitled "Converging Tool Terminology", filed Mar. 30, 2016.
Appendix P.: List of IBM Patents or Patent Applications Treated as Related, Dated Mar. 30, 2016, 2 pages.
Langlois et al, "Virtual Head-Up Displays for Augmented Reality in Cars: A User Testing to Validate the Congruence", ACM, Sep. 2008.
Nicholas Roussopoulao, "An Incremental Access Method for ViewCache: Concept, Algorithms, and Cost Analysis"; University of Maryland, ACM 1991.
Mell et al., "The NIST Definition of Cloud Computing", U.S. Department of Commerce, Computer Security Division, Information Technology Laboratory, National Institute of Standards and Technology, Gaithersburg, MD, Sep. 2011, 7 pages.
Peller, Adam, "dojo/i18n", The Dojo Tool Kit—Reference Guide, V1.0, Printed Jan. 7, 2016 11:51 AM, Found on Post Disclosure Information for END820140580 dated Mar. 12, 2015, 3 pages, <http://dojotoolkit.org/reference-guide/1.10/dojo/i18n.html>.

* cited by examiner

CONVERGING TOOL TERMINOLOGY

BACKGROUND

This present invention relates generally to the field of Software as a Service (SaaS), and more particularly, to utilization of tool terminology in SaaS environments.

Generally speaking, SaaS is a software licensing and delivery model. Software is typically licensed on a subscription basis and is centrally hosted. For example, SaaS can be accessed by users using a client via a web browser. Examples of applications provided in the SaaS environment include office and messaging software, payroll processing software, management software, development software, etc.

SUMMARY

Embodiments of the present invention provide methods, computer program products, and systems for automatically generating a display to present different terms. In one embodiment of the present invention, a computer-implemented method is provided comprising: identifying a first and a second user using applications in a software as a service (SaaS) environment; storing, for the first and the second user, a first term associated with the first user and a second term associated with the second user in the SaaS environment; responsive to identifying the first term associated with the first user and the second term associated with the second user have functionally equivalent definitions, replacing the second term associated with the second user with the first term associated with the first user; and generating a display for the first term associated with the first user that replaced the second term associated with the second user, wherein the display includes a pop-up interface that comprises at least one of the following: one or more definitions for the second term associated with the second user that was replaced, or the second term associated with the second user that was replaced.

DETAILED DESCRIPTION

Figure 1:
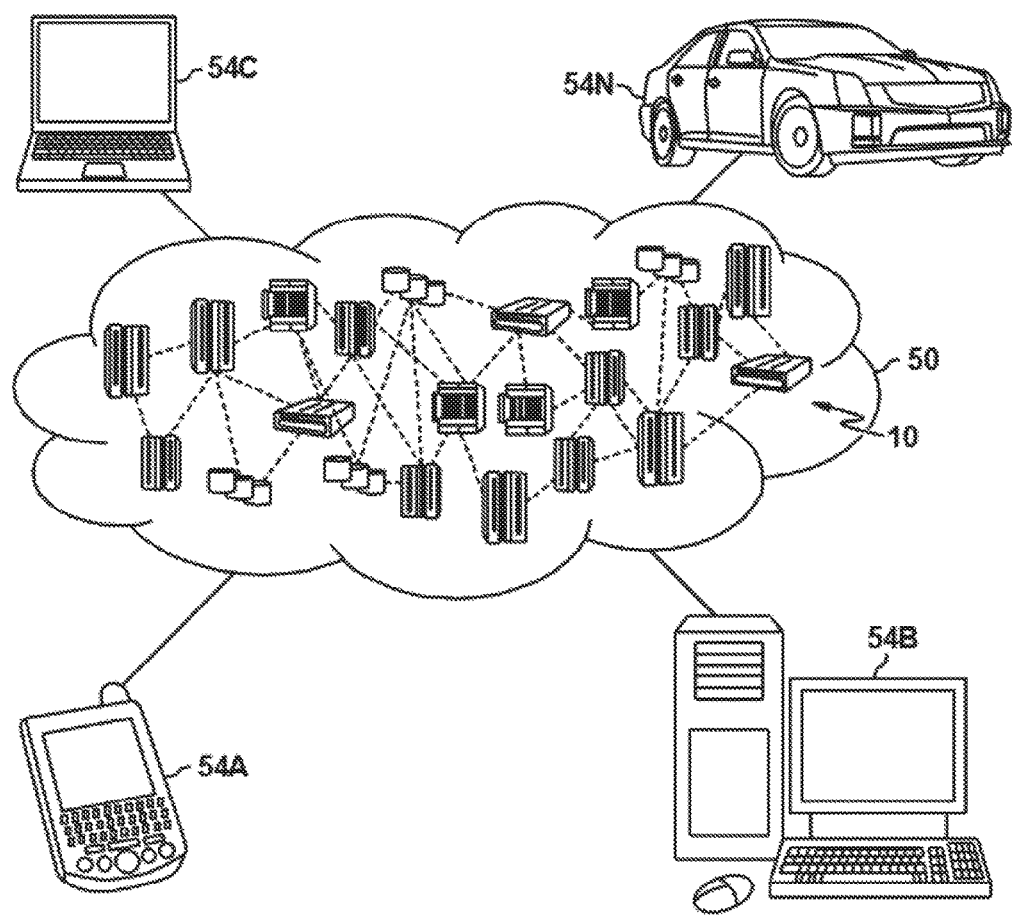
FIG. 1 depicts a cloud computing environment, in accordance with an embodiment of the present invention.

Embodiments of the present invention recognize that during a SaaS installation, multiple customer sets from different companies and/or countries may use the same application on a single server install. Generally, each of these customers may use different terms for the same instances of data. For example, one customer may use a term "CNUM". Conversely, another customer can use "Serial Number" while another customer can use "Employee Id".

Embodiments of the present invention provide solutions for automatically generating a display to present different terms based, at least in part, on customer data. In this manner, as discussed in greater detail later in this specification, embodiments of the present invention can be used to optimize tool terminology.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider.

The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that cloud computing nodes 10 and cloud computing environment 50 can communicate with any type of computerized device over any type of network and/or network addressable connection (e.g., using a web browser).

Figure 2:
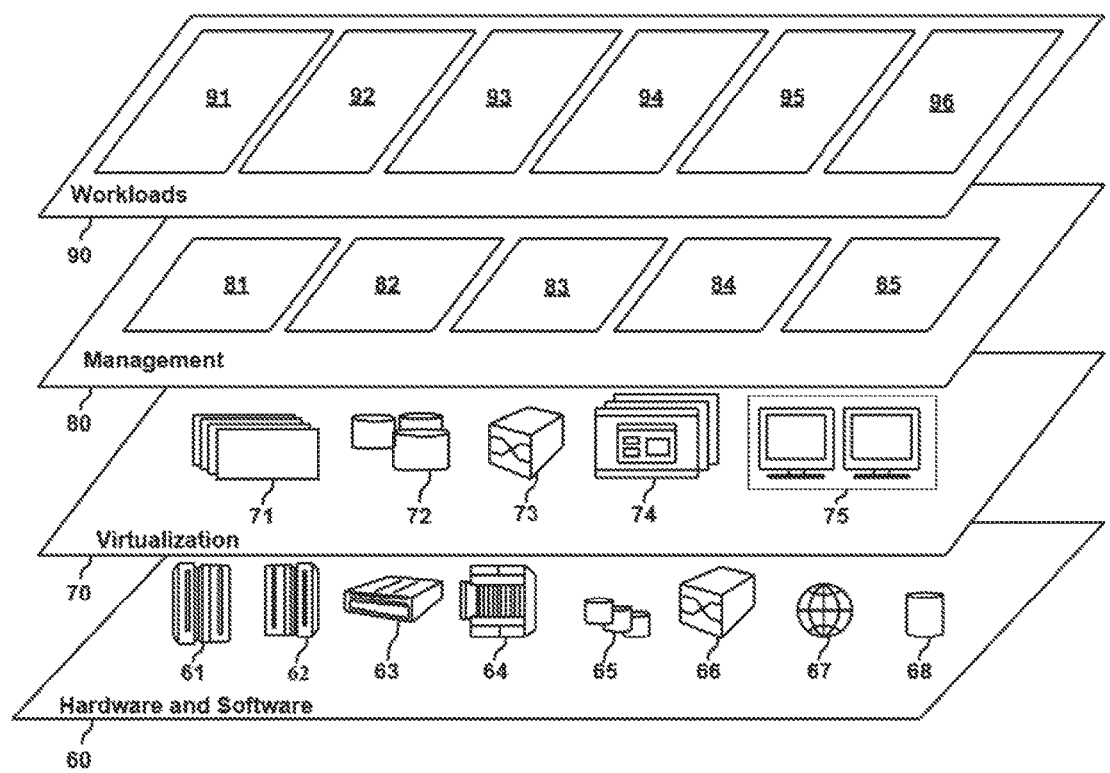
FIG. 2 depicts abstraction model layers, in accordance with an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and enterprise application 96. Some example embodiments of the present invention will be described in the following paragraphs.

Figure 3:
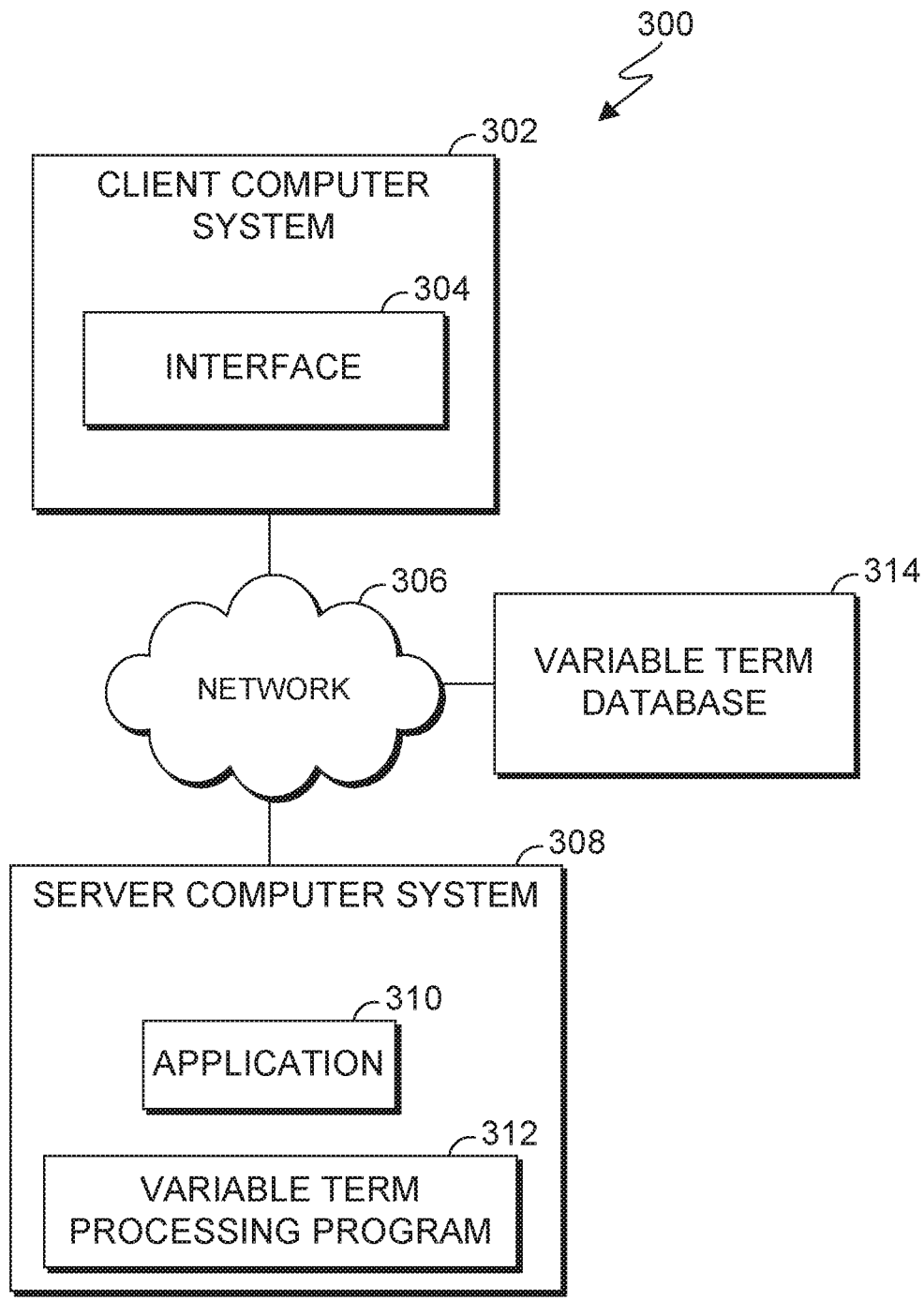
FIG. 3 is a block diagram of a computing environment, in accordance with an embodiment of the present invention.

FIG. 3 is a functional block computing environment 300, in accordance with an embodiment of the present invention. Computing environment 300 includes client computer system 302, server computer system 308, and variable term database 314. Client computer system 302 and server computer system 308 can be desktop computers, laptop computers, specialized computer servers, or any other computer systems known in the art. In certain embodiments, client computer system 302 and server computer system 308 represent computer systems utilizing clustered computers and components to act as a single pool of seamless resources when accessed through network 306. For example, such embodiments may be used in data center, cloud computing, storage area network (SAN), and network attached storage (NAS) applications. In certain embodiments, client computer system 302 and server computer system 308 represent virtual machines. In general, client computer system 302 and server computer system 308 are representative of any electronic devices, or combination of electronic devices, capable of executing machine-readable program instructions, as described in greater detail with regard to FIG. 6.

Client computer system 302 includes interface 304 and communicates with server computer system 308 to access application 310. Interface 304 enables client computer system 302 to access application 310 and can be implemented, for example, using a browser and web service that can access application 310.

Server computer system 308 includes application 310 and provides a service to client computer system 302. For example, application 310 communicates with client computer system 302 via network 306 (e.g., using TCP/IP) and one or more messaging services (not shown) to access, send, receive, and organize electronic messages. Examples of types of services that application 310 can provide include an office and messaging service, payroll processing service, development software, management information systems service, antivirus service, etc.

Variable term processing program 312 analyzes user inputs to build, update, and/or maintain a variable term database. A "variable term" as used herein, refers to one or more terms that are presented in a similar but different manner to different sets of users such as different companies, countries, and/or multiple customer sets. For example, different companies may use different terminology for "serial number". Company A could use the term "CNUM". Company B could use "Serial Number" while Company C could use "IdNum". Each variable term can be definable by each customer, replaced in locations in a web and/or desktop application, and transparent to end users. A "variable term database" as used herein, refers to a collection of terms that may be used interchangeably in a presentation layer (i.e., a user-interface that may be presented to an end-user).

In this embodiment, variable term processing program 312 can utilize natural language processing technology (e.g., sentence splitting, tokenization, POS tagging, chunking, dependency parsing, and anaphora resolution, etc.) to identify variable terms that may be used by a user. In other embodiments, variable term processing program 312 can receive one or more terms defined by an application development team. Responsive to user inputs, variable term processing program 312 parses the user inputs to identify variable terms, verify that the user's variable terms have not changed, and, replace identified variable terms to optimize communications between different companies and/or users, as discussed in greater detail with regard to FIGS. 2 and 3. For example, variable term processing program 312 has replaced, at the presentation layer, variable terms of Company A for Company B. Company A uses the term "CNUM" for serial number while Company B uses the term "EmployeeID" for the same term. Variable term processing program 312 can replace Company B's term of "EmployeeID" with company A's term of "CNUM". Locations where identified variable terms may be replaced include: text that shows on a web interface; text that shows on desktop interfaces; terms that show in help files; terms that are used in import/exports; etc.

In this embodiment, responsive to a user selection, variable term processing program 312 can generate a visual display that includes one or more alternative terms and one or more links to resources that might be helpful to a user. A "user selection" as used herein, refers to any interaction a user can make with a display-based interface. In this embodiment a user selection can be hovering a mouse over text (e.g., a variable term). In other embodiments, where a touch screen is used, a user selection may be made via pressure sensitive touch.

In this embodiment, the visual display may be a pop-up dialog box comprising one or more alternative terms. In other embodiments, the dialog box can display definitions, industry standard terms, terms used by other organizations, etc. In some embodiments, where application 310 is a web application, the visual display can be presented as part of a web interface. Where application 310 is a desktop application, the visual display can be presented as part of a desktop interface. Continuing the above example, variable term processing program 312 can generate a visual display for Company B. For the variable term "CNUM", variable term processing program 312 replaces the text with "EmployeeID" and, optionally, can display a dialog box comprising the term that Company A uses, that is, the generated dialog box can include "Their Term: CNUM". Accordingly, a user associated with Company B can understand Company A's terminology (i.e., that "EmployeeID" and "CNUM" mean the same thing) which can help optimize communications between Company B and Company A.

Variable term processing program 312 can further generate a customized help file for users based, at least in part, on the identified variable terms. Continuing the above example, variable term processing program 312 can generate a help field to identify that the display name for "Identification" has two variable terms (e.g., Employee ID and CNUM) and include each respective company's definition for the variable terms. In this embodiment, variable term processing program 312 can generate a link to a customized help file in the generated visual display.

Variable term database 314 is a database that stores one or more terms used in application 310. Variable term database 314 can be implemented using any non-volatile storage media known in the art. For example, variable term database 314 can be implemented with a tape library, optical library, one or more independent hard disk drives, or multiple hard disk drives in a redundant array of independent disks (RAID).

Network 306 can be, for example, a local area network (LAN), a wide area network (WAN) such as the Internet, or a combination of the two, and include wired, wireless, or fiber optic connections. In general, network 306 can be any combination of connections and protocols that will support communications between client computer system 302, server computer system 308, and variable term database 314, in accordance with a desired embodiment of the invention.

For illustrative purposes, FIG. 3 shows interface 304, application 310, and variable term database 314 as being on separate computer systems. However, it should be understood that each element (e.g., interface 304, application 310, and variable term database 314) may be on the same computer system or any number of combinations on multiple computer systems. For example, in other embodiments, variable term database 314 may reside on server computer system 308 with application 310.

Figure 4:
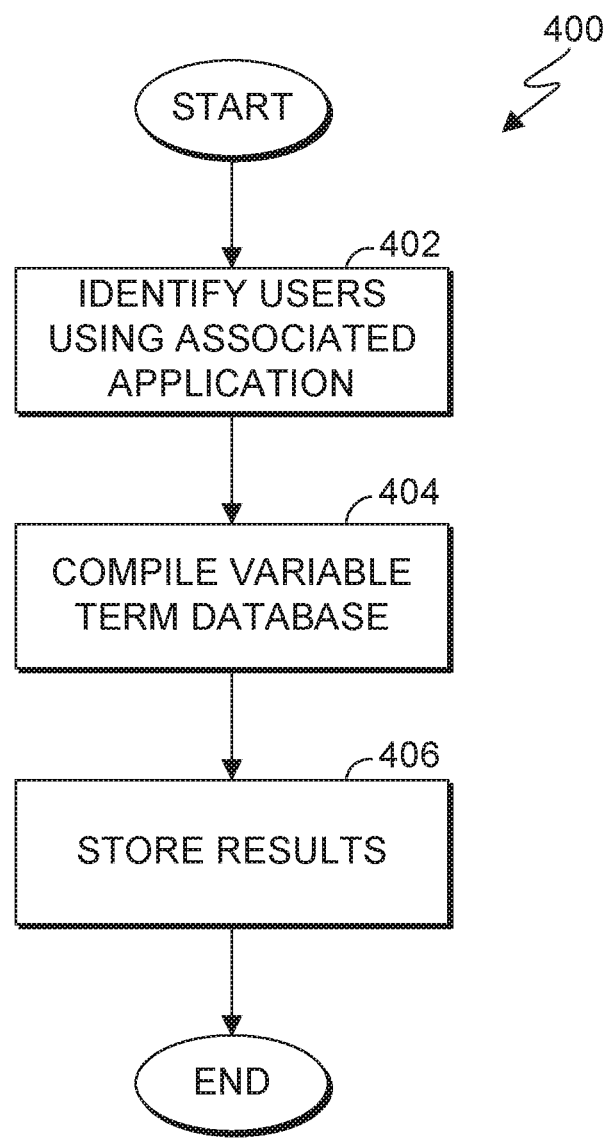
FIG. 4 is a flowchart illustrating operational steps updating a variable term database, in accordance with an embodiment of the present invention.

FIG. 4 is a flowchart 400 illustrating operational steps updating a variable term database, in accordance with an embodiment of the present invention.

In step 402, variable term processing program 312 identifies customers using application 310. In this embodiment, variable term processing program 312 identifies customers using application 11 responsive to receiving a query from interface 304. In other embodiments, variable term processing program 312 identifies customers using application 310 by receiving a query from one or more other components of computing environment 300.

In step 404, variable term processing program 312 compiles a variable term database for the identified customers. In this embodiment, variable term processing program 312 builds a variable term database by determining whether customer mapping exists. A customer mapping as used herein, refers to a mapping of potential variables and and/or terms utilized by a user. Responsive to determining that customer mapping exists, variable term processing program 312 iterates the existing customer mapping in variable term database 314. In other words, responsive to determining that customer mapping exists, variable text processing program copies the existing customer mapping into variable term database 314. An example table of program variables (e.g., application 310 variables) is reproduced below:

TABLE 1

| Program Variables | Company A Mapping |
| --- | --- |
| CNUM | Employee ID |
| Resource | Employee Name |
| Division | Region |

Responsive to determining that customer mapping does not exist, variable term processing program 312 can develop customer mapping. For example, an instance where no mapping exists can include a scenario where it is the first time a user uses a SaaS offering. Another instance where no mapping exists can include a scenario where it is the first time user alpha of Company A interacts with user beta of Company B. Other instances can include scenarios where a customer mapping needs to be developed for text within a field edited or otherwise manipulated (e.g., a word or words contained within text of a page).

In this embodiment, variable term processing program 312 can build customer mapping either manually or automatically. For example, variable term processing program 312 can manually add customer mapping by transmitting a form with variables to interface 304. A user can then complete the form to indicate various customer mappings. Responsive to receiving input (e.g., a completed form) from interface 304, variable term processing program 312 can store the input in variable term database 314.

Variable term processing program 312 can automatically add customer mapping by connecting to a client's existing network (e.g., via API, remote login, etc.) to analyze existing applications (e.g., application 310). In this embodiment, variable term processing program 312 analyzes existing applications by submitting a query to customer applications (e.g., application 310) to provide a list of displayed field names.

Variable term processing program 312 can then compare field names from existing applications against the new application that variable term processing program 312 is currently connected to using natural language processing. For example, variable term processing program 312 can compare field names from existing applications against the new application to identify the field or fields in the existing applications that have the greatest similarity to the new application field names. Accordingly, variable term processing program 312 can pre-populate a description field with definitions obtained from the user's network. In some embodiments, variable term processing program 312 can provide the user with an opportunity to review and correct variable mapping and definitions.

In step 406, variable term processing program 312 stores the generated customer mapping in variable term database 314. In this embodiment, variable term processing program 312 stores the generated customer mapping in variable term database 314 by transmitting the generated customer mapping via network 306 to variable term database 314.

Figure 5:
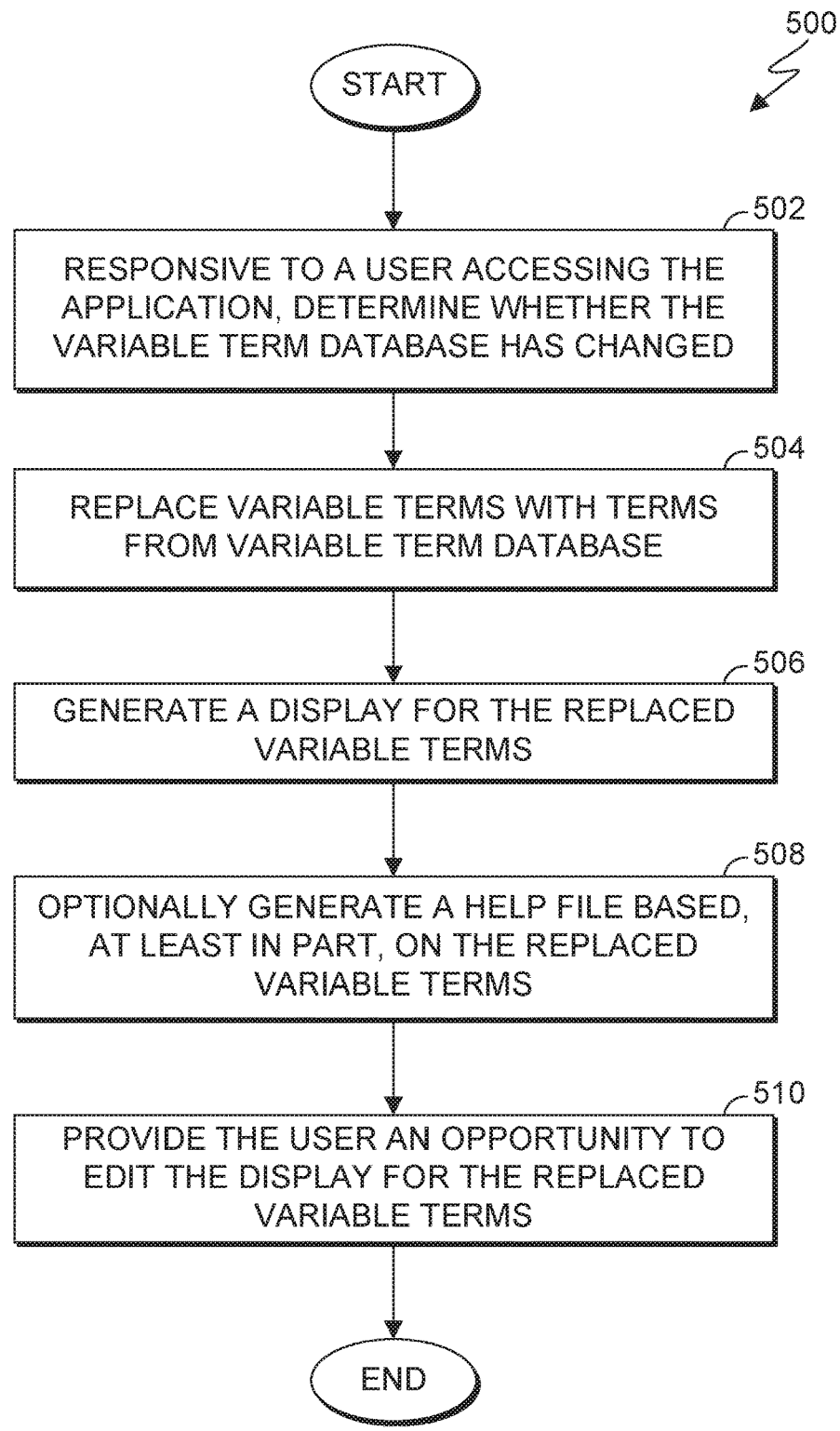
FIG. 5 is a flowchart illustrating operational steps for generating a display for a text place holder, in accordance with an embodiment of the present invention.

FIG. 5 is a flowchart 500 illustrating operational steps for generating a display for a text place holder, in accordance with an embodiment of the present invention. For example, the operational steps of flowchart 500 can be performed after the operational steps of flowchart 400. For illustrative purposes, the following discussion is made with respect to variable term processing program 312 replacing variable terms for an application that has an associated customer mapping that has not changed. However, it should be understood that variable term processing program 312 can replace variable terms for an application that has an associated customer mapping that has changed.

In step 502, responsive to a user accessing an application (e.g., application 310), variable term processing program 312 determines whether variable term database 314 has changed. In this embodiment, variable term processing program 312 determines whether variable term database 314 has changed by querying the variable term database (e.g., variable term database 314). In other embodiments, variable term processing program 312 can determine whether variable term database 314 has changed by comparing a "last saved" version of variable term database 314 to the copy currently accessed by variable term processing program 312. In instances where variable term database 314 has changed since the original customer mapping was built, variable term processing program 312 can update and save the new customer mapping in variable term database 314.

In step 504, variable term processing program 312 replaces variable terms with terms from variable term database 314. In this embodiment, variable term processing program 312 replaces variable terms with terms from variable term database 314 by parsing through application 310, identifying variable terms that have a degree of similarity to terms found in variable term database 314, and replacing the identified variable terms with terms in variable term database 314. For example, variable term processing program 312 can identify at the presentation layer (i.e., display layer), terms that have been identified as possible variable terms between Company A for Company B. In this example, variable term processing program 312 has identified that Company A uses the term "CNUM" for serial number while Company B uses the term "EmployeeID" for the same term. Accordingly, each time a visual display is presented to Company B, variable term processing program 312 can replace Company B's identified variable term of "EmployeeID" with company A's identified variable term of "CNUM".

In another example, variable term processing program 312 can generate a visual display presented to Company B that displays Company A's term, responsive to a user selection. For example, each time a user associated with Company B selects "CNUM" (a variable term associated with company A), variable term processing program 312 can generate a visual display comprising Company B's term (e.g., EmployeeID) along with relevant definitions and/or links to help files associated with the variable term.

In yet another example, where Company B accesses application 310, variable term processing program 312 can replace the default terms of application 310 with Company B's terms. For example, a default term of application 310 can be "manager" while Company B uses the term "supervisor". When displaying forms to Company B, variable term processing program 312 can replace the default term of "manager" to "supervisor".

In step 506, variable term processing program 312 generates a display for the replaced variable terms. In this embodiment, a display can be a pop-up dialog box comprising one or more alternative terms that displays responsive to a user selection. For example, in an embodiment where a user uses a monitor and a mouse, a user selection can be hovering the mouse position over the variable term. In an embodiment where a touch screen is used, a user selection can be selecting the variable term via a touch screen interface. In this embodiment, variable term processing program 312 generates a display for the replaced variable terms by accessing variable term database 314, identifying variable terms, and linking the variable terms.

For example, variable term processing program 312 can access variable term database 314, identify that for an "employee position" that "Manager", a term associated with Company B and "Supervisor", a term associated with Company A are variable terms based on similarity and/or definitions provided by respective users, and link "Manager" and "Supervisor". Responsive to a user associated with Company B selecting the variable term "Supervisor", variable term processing program 312 can display a dialog box comprising the term that Company B uses, that is, the generated dialog box can include their term: "Manager". Accordingly, a user associated with Company B can understand Company A's terminology (i.e., that "Supervisor" and "Manager" mean the same thing) which can help optimize communications between Company B and Company A.

In step 508, variable term processing program 312 optionally generates a help file based, at least in part, on the replaced variable terms. In this embodiment, variable term processing program 312 generates a help file based, at least in part, on the replaced variable terms by parsing through application 310 to identify replaced variable terms and respective definitions and/or explanations for each of the replaced variable terms. Accordingly, variable term processing program 312 compiles the respective definitions for each of the replaced variable terms into a single medium for the user. For example, the medium can be a text-based file.

In step 510, variable term processing program 312 provides the user an opportunity to edit the display for the replaced variable terms. In this embodiment, variable term processing program 312 provides the user an opportunity to edit the display for the replaced variable terms by transmitting a notification to the user. In this embodiment the notification can include a list of variable terms that variable term processing program 312 replaced along with associated definitions and/or explanations.

Figure 6:
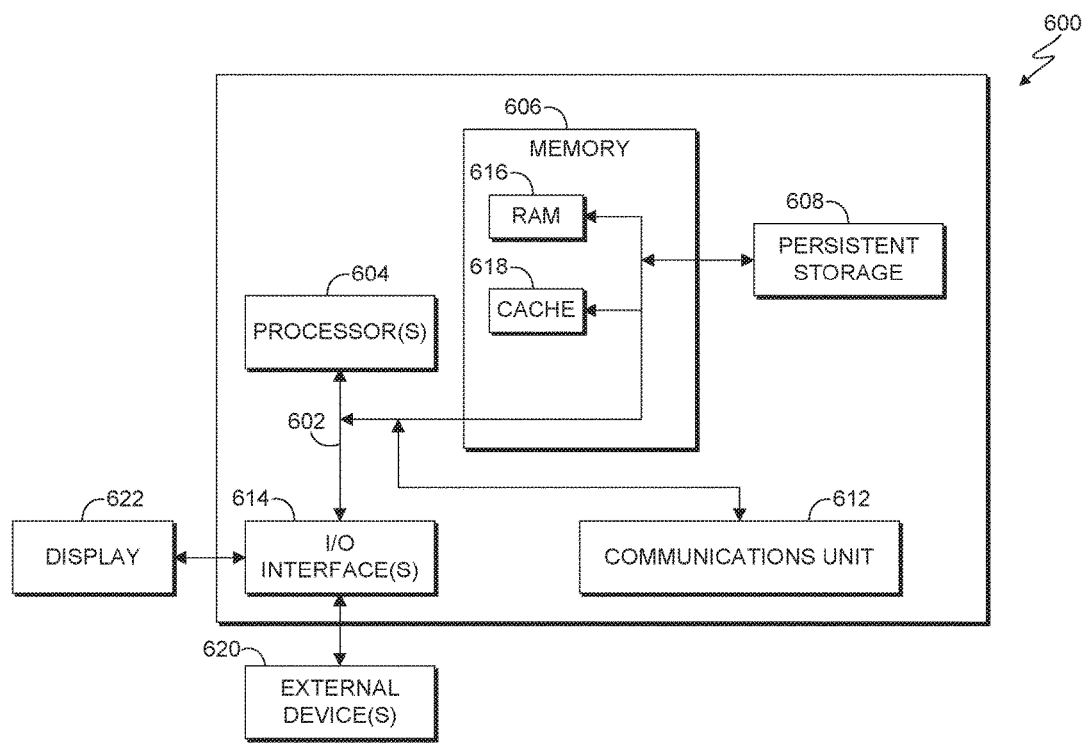
FIG. 6 is a block diagram of internal and external components of the computer systems of FIG. 3, in accordance with an embodiment of the present invention.

FIG. 6 is a block diagram of internal and external components of a computer system 600, which is representative the computer systems of FIG. 3, in accordance with an embodiment of the present invention. It should be appreciated that FIG. 6 provides only an illustration of one implementation and does not imply any limitations with regard to the environments in which different embodiments may be implemented. In general, the components illustrated in FIG. 6 are representative of any electronic device capable of executing machine-readable program instructions. Examples of computer systems, environments, and/or configurations that may be represented by the components illustrated in FIG. 6 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 600 includes communications fabric 602, which provides for communications between one or more processors 604, memory 606, persistent storage 608, communications unit 612, and one or more input/output (I/O) interfaces 614. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (RAM) 616 and cache memory 618. In general, memory 606 can include any suitable volatile or non-volatile computer-readable storage media. Software is stored in persistent storage 608 for execution and/or access by one or more of the respective processors 604 via one or more memories of memory 606.

Persistent storage 608 may include, for example, a plurality of magnetic hard disk drives. Alternatively, or in addition to magnetic hard disk drives, persistent storage 608 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 608 can also be removable. For example, a removable hard drive can be used for persistent storage 608. Other examples include optical and magnetic disks, thumb drives, and smart cards that are inserted into a drive for transfer onto another computer-readable storage medium that is also part of persistent storage 608.

Communications unit 612 provides for communications with other computer systems or devices via a network (e.g., network 306). In this exemplary embodiment, communications unit 612 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded to client computer system 302 through communications unit 612 (e.g., via the Internet, a local area network or other wide area network). From communications unit 612, the software and data can be loaded onto persistent storage 608.

One or more I/O interfaces 614 allow for input and output of data with other devices that may be connected to computer system 600. For example, I/O interface 614 can provide a connection to one or more external devices 620 such as a keyboard, computer mouse, touch screen, virtual keyboard, touch pad, pointing device, or other human interface devices. External devices 620 can also include portable computer-readable storage media such as, for example, thumb drives, portable optical or magnetic disks, and memory cards. I/O interface 614 also connects to display 622.

Display 622 provides a mechanism to display data to a user and can be, for example, a computer monitor. Display 622 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
identifying a first and a second user using applications in a software as a service (SaaS) environment;
responsive to identifying a first variable term associated with the first user and a second variable term associated with the second user have functionally equivalent definitions using a compiled customer mapping, replacing the second variable term associated with the second user with the first variable term associated with the first user;
receiving one or more user inputs from the second user that accessed a first application of the applications in the SaaS environment that the first user has also accessed, wherein the one or more terms not included in the variable term database;
responsive to receiving the one or more user inputs, parsing the one or more user inputs to identify variable terms from the one or more user inputs, verifying that the identified variable terms have functionally equivalent definitions to variable terms included in the variable term database, and replacing the identified variable terms to optimize communications between the first and the second user; and
generating a first display for the first variable term associated with the first user that replaced the second variable term associated with the second user, wherein the first display includes a pop-up interface that comprises the second variable term associated with the second user that was replaced and one or more definitions for the second variable term associated with the second user that was replaced.

2. The computer-implemented method of claim 1, further comprising:
generating a help file based, at least in part, on the first term associated with the first user that replaced the second term associated with the second user.

3. The computer-implemented method of claim 1, further comprising:
providing an opportunity to edit the display for the first term associated with the first user that replaced the second term associated with the second user.

4. The computer-implemented method of claim 1, further comprising:
responsive to the second user accessing an application in the SaaS environment, determining whether the first term associated with the first user and the second term associated with the second user have changed; and
responsive to determining that the first term associated with the first user and the second term associated with the second user have changed, updating the first term associated with the first user and the second term associated with the second user.

5. The computer-implemented method of claim 1, further comprising:
responsive to identifying a third term associated with the first user and a fourth term associated with the second user have functionally equivalent definitions, generating a display for the third term associated with the first user, wherein the display includes a pop-up interface that comprises at least one of the following: the fourth term associated with the second user that has a functionally equivalent definition to the third term associated with the first user and definitions associated with the fourth term associated with the second user.

6. The computer-implemented method of claim 1, further comprising:
storing, for the first and the second user, associated terms associated with each of the first and the second user wherein storing, for the first and the second user, associated terms associated with each of the first and the second user comprises:
responsive to receiving the first term associated with the first user and the second term associated with the second user, compiling a respective customer mapping of the first term associated with the first user and the second term associated with the second user.

7. The computer-implemented method of claim 6, wherein storing, for the first and the second user, associated terms associated with each of the first and the second user comprises:
submitting a query to the applications in the SaaS environment for the first term associated with the first user and the second term associated with the second user;
responsive to receiving the first term associated with the first user and the second term associated with the second user from the applications in the SaaS environment, using natural language processing to analyze the first term associated with the first user and the second term associated with the second user; and
compiling a respective customer mapping of the first term associated with the first user and the second term associated with the second user.

8. A computer program product comprising:
one or more computer readable storage media and program instructions stored on the one or more computer readable storage media, the program instructions comprising:
program instructions to identify a first and a second user using applications in a software as a service (SaaS) environment;
program instructions to, responsive to identifying a first variable term associated with the first user and a second variable term associated with the second user have functionally equivalent definitions using a compiled customer mapping, replace the second variable term associated with the second user with the first variable term associated with the first user;
program instructions to receive one or more user inputs from the second user that accessed a first application of the applications in the SaaS environment that the first user has also accessed, wherein the one or more terms not included in the variable term database;
program instructions to, responsive to receiving the one or more user inputs, parsing the one or more user inputs to identify variable terms from the one or more user inputs, verify that the identified variable terms have functionally equivalent definitions to variable terms included in the variable term database, and replace the identified variable terms to optimize communications between the first and the second user; and
program instructions to generate a first display for the first variable term associated with the first user that replaced the second variable term associated with the second user, wherein the first display includes a pop-up interface that comprises the second variable term associated with the second user that was replaced and one or more definitions for the second variable term associated with the second user that was replaced.

9. The computer program product of claim 8, wherein the program instructions stored on the one or more computer readable storage media further comprise:
program instructions to generate a help file based, at least in part, on the first term associated with the first user that replaced the second term associated with the second user.

10. The computer program product of claim 8, wherein the program instructions stored on the one or more computer readable storage media further comprise:
program instructions to provide an opportunity to edit the display for the first term associated with the first user that replaced the second term associated with the second user.

11. The computer program product of claim 8, wherein the program instructions stored on the one or more computer readable storage media further comprise:
program instructions to, responsive to the second user accessing an application in the SaaS environment, determine whether the first term associated with the first user and the second term associated with the second user have changed; and
program instructions to, responsive to determining that the first term associated with the first user and the second term associated with the second user have changed, update the first term associated with the first user and the second term associated with the second user.

12. The computer program product of claim 8, wherein the program instructions stored on the one or more computer readable storage media further comprise:
program instructions, to responsive to identifying a third term associated with the first user and a fourth term associated with the second user have functionally equivalent definitions, generate a display for the third term associated with the first user, wherein the display includes a pop-up interface that comprises at least one of the following: the fourth term associated with the second user that has a functionally equivalent definition to the third term associated with the first user and definitions associated with the fourth term associated with the second user.

13. The computer program product of claim 8, wherein the program instructions stored on the one or more computer readable storage media further comprise;
program instructions to store, for the first and the second user, associated terms associated with each of the first and the second user, wherein the program instructions to store, for the first and the second user, associated terms associated with each of the first and the second user comprise:
program instructions to, responsive to receiving the first term associated with the first user and the second term associated with the second user, compile a respective customer mapping of the first term associated with the first user and the second term associated with the second user.

14. The computer program product of claim 13, wherein the program instructions to store, for the first and the second user, associated terms associated with each of the first and the second user comprise:
program instructions to submit a query to applications in the SaaS environment for the first term associated with the first user and the second term associated with the second user;
program instructions to, responsive to receiving the first term associated with the first user and the second term associated with the second user from the applications in the SaaS environment, use natural language processing to analyze the first term associated with the first user and the second term associated with the second user; and
program instructions to compile a respective customer mapping of the first term associated with the first user and the second term associated with the second user.

15. A computer program product comprising:
one or more computer processors;
one or more computer readable storage media; and
program instructions stored on the one or more computer readable storage media for execution by at least one of the one or more computer processors, the program instructions comprising:
program instructions to identify a first and a second user using applications in a software as a service (SaaS) environment;
program instructions to, responsive to identifying a first variable term associated with the first user and a second variable term associated with the second user have functionally equivalent definitions using a compiled customer mapping, replace the second variable term associated with the second user with the first variable term associated with the first user;
program instructions to receive one or more user inputs from the second user that accessed a first application of the applications in the SaaS environment that the first user has also accessed, wherein the one or more terms not included in the variable term database;
program instructions to, responsive to receiving the one or more user inputs, parsing the one or more user inputs to identify variable terms from the one or more user inputs, verify that the identified variable terms have functionally equivalent definitions to variable terms included in the variable term database, and replace the identified variable terms to optimize communications between the first and the second user; and
program instructions to generate a first display for the first variable term associated with the first user that replaced the second variable term associated with the second user, wherein the first display includes a pop-up interface that comprises the second variable term associated with the second user that was replaced and one or more definitions for the second variable term associated with the second user that was replaced.

16. The computer program product of claim 15, wherein the program instructions stored on the one or more computer readable storage media further comprise:
program instructions to generate a help file based, at least in part, on the first term associated with the first user that replaced the second term associated with the second user.

17. The computer program product of claim 15, wherein the program instructions stored on the one or more computer readable storage media further comprise:

program instructions to provide an opportunity to edit the display for the first term associated with the first user that replaced the second term associated with the second user.

18. The computer program product of claim 15, wherein the program instructions stored on the one or more computer readable storage media further comprise:

program instructions to, responsive to the second user accessing an application in the SaaS environment, determine whether the first term associated with the first user and the second term associated with the second user have changed; and program instructions to, responsive to determining that the first term associated with the first user and the second term associated with the second user have changed, update the first term associated with the first user and the second term associated with the second user.

19. The computer program product of claim 15, wherein the program instructions stored on the one or more computer readable storage media further comprise:

program instructions, to responsive to identifying a third term associated with the first user and a fourth term associated with the second user have functionally equivalent definitions, generate a display for the third term associated with the first user, wherein the display includes a pop-up interface that comprises at least one of the following: the fourth term associated with the second user that has a functionally equivalent definition to the third term associated with the first user and definitions associated with the fourth term associated with the second user.

20. The computer program product of claim 15, wherein the program instructions stored on the one or more computer readable storage media further comprise;

program instructions to store, for the first and the second user, associated terms associated with each of the first and the second user, wherein the program instructions to store, for the first and the second user, associated terms associated with each of the first and the second user comprise:

program instructions to, responsive to receiving the first term associated with the first user and the second term associated with the second user, compile a respective customer mapping of the first term associated with the first user and the second term associated with the second user.

* * * * *